D. WARREN.
STEAM TRAP.
APPLICATION FILED FEB. 24, 1912.

1,057,469.

Patented Apr. 1, 1913.

Witnesses:

Inventor:

UNITED STATES PATENT OFFICE.

DAVID WARREN, OF LEWISTON, MAINE.

STEAM-TRAP.

1,057,469.

Specification of Letters Patent.

Patented Apr. 1, 1913.

Application filed February 24, 1912. Serial No. 679,729.

*To all whom it may concern:*

Be it known that I, DAVID WARREN, of Lewiston, in the county of Androscoggin and State of Maine, have invented certain new and useful Improvements in Steam-Traps, of which the following is a specification.

My invention relates to a steam trap of that class wherein the water of condensation is held in the trap against the action of an outward opening spring valve, the valve being opened against the action of its spring by the lifting of a float within the trap combined with the internal steam pressure.

The object of my invention is to provide a practical and simple trap of this class in which the lifting power of the float will be so applied as to easily open the valve against a heavy external pressure so that the trap may be used for either high or low pressure.

My invention may best be understood by reference to the accompanying drawing, in which—

Figure 1:
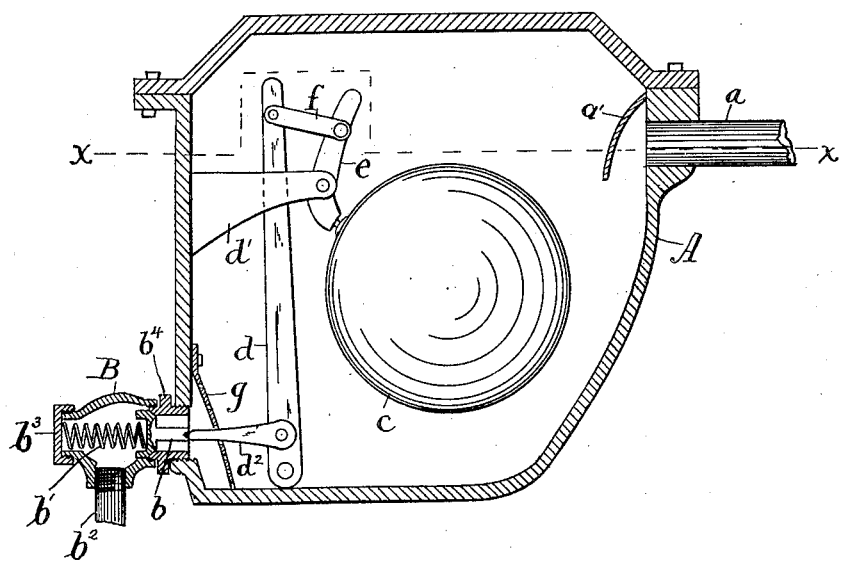
Figure 2:
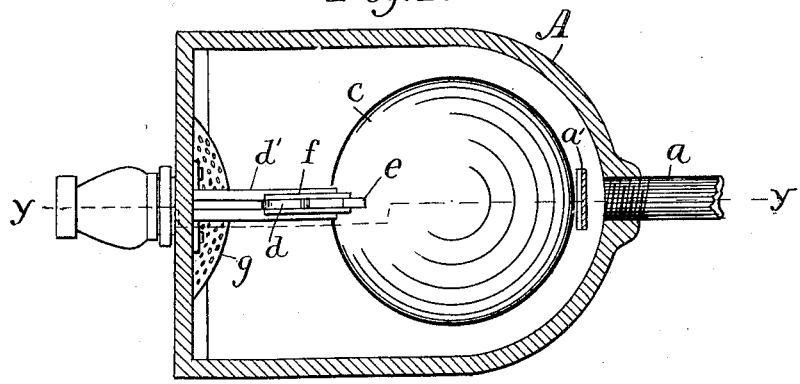

Figure 1 is a vertical section through my trap taken on the line $y$ $y$ of Fig. 2, and Fig. 2 is a horizontal section taken on the line $x$ $x$ of Fig. 1.

In the drawing, A represents the trap proper and it is preferably a cast iron chamber closed tightly by a suitable top or cover. An inlet pipe $a$ is provided which preferably enters near the top of the trap and an outlet is provided at the bottom of the trap where the water of condensation is discharged. A baffle plate $a'$ protects the inlet pipe from discharging water onto the float and a screen plate $g$ protects the outlet from any sediment which might obstruct the valve. The outlet of the trap is controlled by a spring valve which opens outward. As here shown, the valve designated generally by B is made up of a bushing $b^4$ which screws into an opening in the trap and which has formed therein the valve seat. The valve proper $b$ slides in the bushing and fits the valve seat. A casing fits the outer end of the bushing, one end of the casing being closed by a cap $b^3$ and the lower portion being connected with an outlet pipe $b^2$. A spring $b'$ is interposed between the valve $b$ and the cap and tends to hold the valve closed against any internal pressure.

The valve is forced open against the action of the spring by mechanism connecting with the float $c$ which may be of usual construction. As here shown, the float $c$ has secured to it a rigid arm $e$ which is pivoted between its end and the float to the bifurcated end of a two part bracket $d'$. The bracket $d'$ is made with two parallel sides forming a guiding space between them in which is pivoted the arm $e$ as described. The double bracket also serves as a guide for the upper end of the vertically disposed lever $d$ which is pivoted by its lower end to the floor of the chamber adjacent to the outlet. The upper end of the arm $e$ is connected with the upper end of the lever $d$ by a link $f$.

The valve is operated directly by a valve stem $d^2$ which is pivoted to the lever $d$ immediately above its lower end and passes through the strainer plate $g$ which acts as a guide to steady the valve stem. The outer end of the valve stem is held in a pivoting recess in the inner end of the valve. This means of connecting the valve stem prevents all tendency to bind.

In practice, the spring $b'$ is made strong enough to hold the valve closed against any internal pressure which there may be on the system whether high or low pressure. When the condensed water rises in the trap the float turns the arm $e$ on its pivoting point and the arm $e$ forces the lever $d$ over opening the valve through the action of the pivoted valve stem $d^2$. The water is then forced from the trap through the valve and when the float drops sufficiently the valve will close. The float thus vibrates between its upper and its lower position producing an intermittent discharge and keeping the drip pipe clear of water. The strainer plate $g$ keeps all sediment away from the valve and prevents the latter from clogging, and the baffle plate $a'$ deflects the incoming water downward so that the float will not be affected by it.

It will be seen that by the use of lever $d$ and the arm $e$ the float exerts a compound leverage on the valve and is thus able to open it against the heavy pressure of the spring.

The construction is simple, the parts are easily reached and the arrangement enables the float to exert great pressure on the valve while being confined in a small chamber.

I claim;—

A steam trap including a closed chamber, an inlet therefor, an outlet in the lower portion thereof, a horizontally disposed valve for controlling said outlet, an external spring for closing said valve, a pair of parallel brackets in the side of said chamber disposed side by side to form a guiding space between them, an upright lever pivoted at its lower end and having its upper end movable in said guiding space and guided by said brackets, a horizontally disposed valve spindle connected with said valve and to said upright lever, a float, an upward extending arm for said float pivoted at a point between its ends to the ends of said brackets and a link connecting the upper end of said arm and the upper end of said upright lever.

In testimony whereof I have affixed my signature, in presence of two witnesses.

DAVID WARREN.

Witnesses:
JAMES A. PULSIFER,
HENRY W. OAKES.